March 16, 1971 P. SADA 3,570,213
MACHINE FOR CUTTING AND CANNING FOOD PRODUCTS IN
PLASTIC STATE, PARTICULARLY MEAT
Filed July 15, 1968 2 Sheets-Sheet 1

PIETRO SADA, INVENTOR

BY Wenderoth, Lind & Ponack.

ATTORNEYS

March 16, 1971  P. SADA  3,570,213
MACHINE FOR CUTTING AND CANNING FOOD PRODUCTS IN
PLASTIC STATE, PARTICULARLY MEAT
Filed July 15, 1968  2 Sheets-Sheet 2
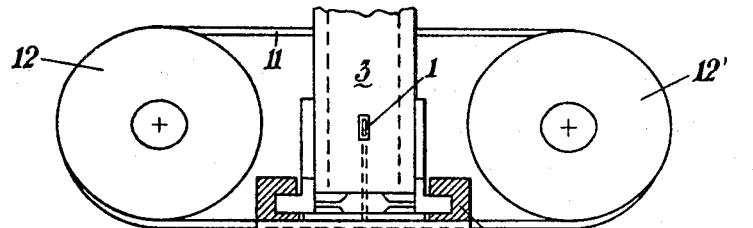
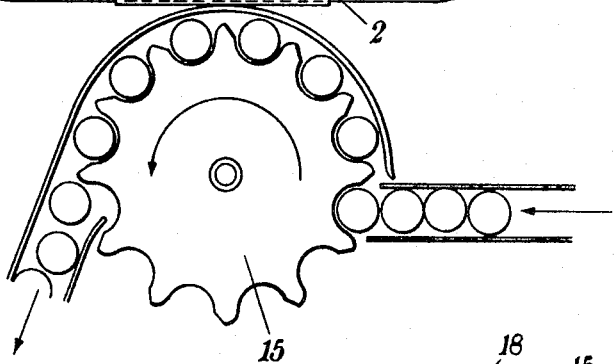
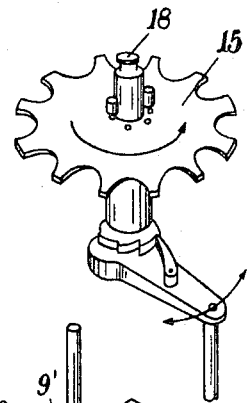
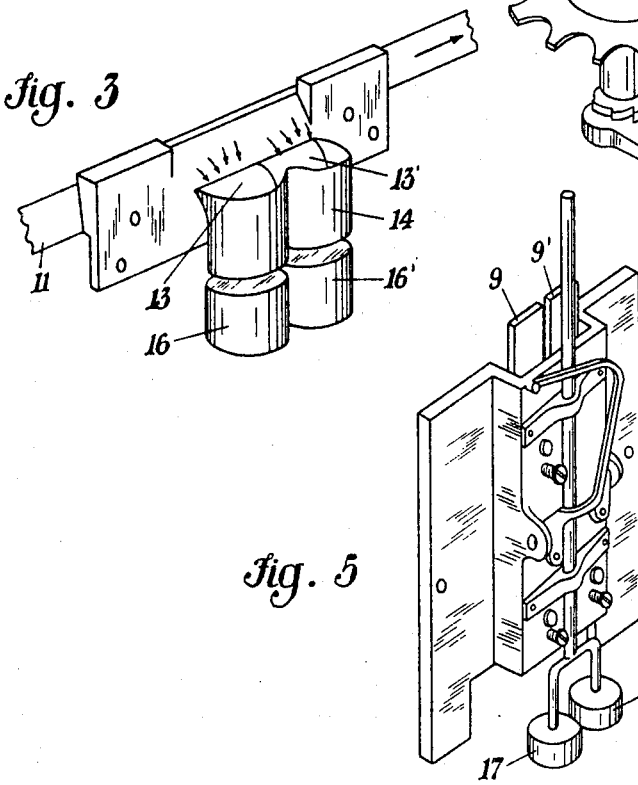
PIETRO SADA
INVENTOR
BY Wenderoth, Lind & Ponack
ATTORNEYS 3,570,213
MACHINE FOR CUTTING AND CANNING FOOD
PRODUCTS IN PLASTIC STATE, PARTICULARLY
MEAT
Pietro Sada, Aprilia, Latina, Italy
Filed July 15, 1968, Ser. No. 744,789
Claims priority, application Italy, Feb. 24, 1968,
35,073/68
Int. Cl. B65b 63/00, 1/24, 25/06
U.S. Cl. 53—123     1 Claim

ABSTRACT OF THE DISCLOSURE

A machine for cutting and canning food products in plastic state, particularly meat, characterized by the combination of a product reservoir which is periodically loaded with the product to be canned, and from which a prefixed amount is caused to issue sequentially from an outlet slot at a filling station. The pre-fixed amount of product is cut and conveyed into a box, from where it is further compacted and arranged within a can. The machine sequentially sends cans to the filling station from a feeding reservoir, in order to impart thereto a distinguishing mark and for ejecting them when the operations are ended.

---

The present invention relates to a machine for cutting and canning food products in plastic state, particularly meat. More particularly the object of the present invention is an improvement of the machine as described in the U.S. Pat. No. 2,911,776 filed on Nov. 12, 1957 and granted on Nov. 10, 1959 in the name of the same applicant, destined to carry out automatically the can filling operations under the best hygienic conditions, and with remarkable quickness and uniformity.

Said original machine comprises in combination, a reservoir which will be periodically filled with the product to be canned, means for compressing said product within the reservoir and for causing the sequential feeding of a pre-fixed amount of said product through an outlet aperture, means destined to carry out the cutting operations of said pre-fixed amount and to convey it into a can, means for settling the product within said can, and means for sequentially sending said cans to the filling station from a supply station, for imprinting thereon a distinctive mark and for ejecting the cans when the operations are ended.

According to the present invention, changes and modifications are provided for the members for dividing the product to be canned, for charging and for compressing said product and for supplying the cans, so as to render at least double the productive speed of the machine.

According to this invention a vertical cutting blade is provided, rigidly connected to the head in its vertical reciprocation, in order to subdivide into two equal portions the mass of the food product filled and compressed into the reservoir, and further provides for a vertical plate in the central lower zone of the reservoir for the purpose of maintaining the separation of the two portions of food product, cut by said blade.

Additional differentiating features will include:

a double plate substituted for the single plate of the dosing chamber;
replacing the single loading mouth with a double mouth;
utilizing double compressing pistons for compressing the product in order to obtain the simultaneous compression of the product into two cans; and
the feeding indexing fixture with six recesses will be replaced by another fixture with twelve recesses.

This invention will be now described with reference to the attached drawings showing by way of non limiting example one preferred embodiment of the invention itself.

In the drawings:

FIG. 2 shows a diagrammatical plane view of the movable head;

FIG. 3 shows a perspective view of the double mouth;

FIG. 4 shows a perspective view of the feeding indexing fixture for the cans;

FIG. 5 shows a perspective view of the dosing plates and of an associated counterplate with the pair of pistons of the movable head of the machine.

Figure 1:
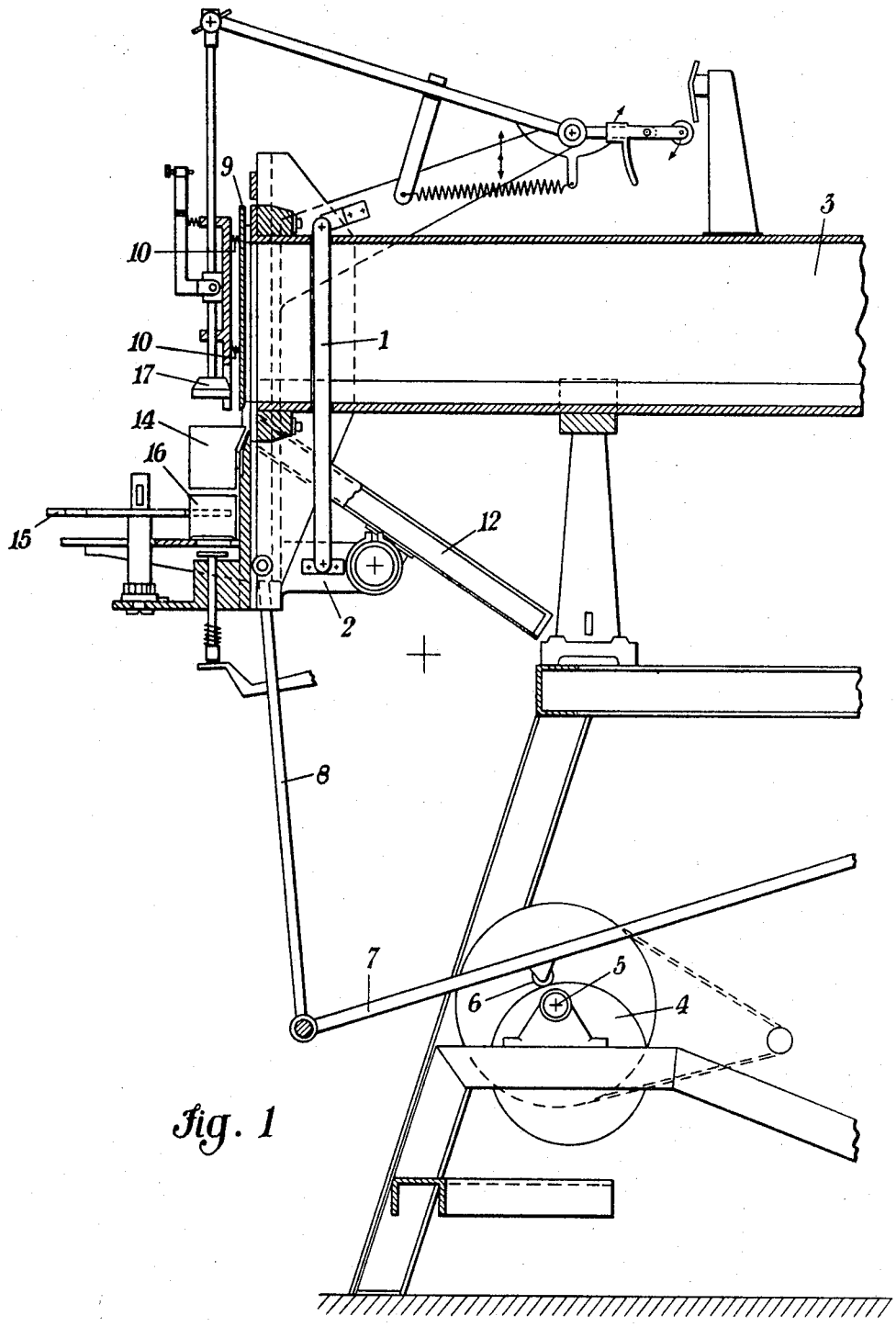
FIG. 1 illustrates the movable head of the machine, shown in vertical cross-section taken along a vertical plane.

With reference to the drawings and particularly to FIGS. 1 and 2, the invention includes a cutting vertical blade 1, fixed at both ends to the frame of the movable head 2. The meat, as described in the specification of applicant's said patent, will be compressed in the feeding reservoir 3 and is pushed against said blade 1. This blade is vertically reciprocated by the movable head 2 which in turn is operated by the cam 4 which while rotating about the shaft 5 bears against a roller 6 mounted on the lever 7. This lever 7, pivoted at one of its ends, not shown in the figure, is connected to the movable head 2 by means of the connecting rods 8.

The meat mass which comes forward against the blade 1 will be divided thereby into two equal parts as it arrives at the end of the feeding reservoir 3, and which parts strike against the two dosing plates 9 and 9' respectively (FIG. 5). Plates 9, 9' are moved so as to overcome the contrary action of two helical springs 10, having a pre-fixed length, in order to effect the filling of a can of predetermined size.

At this point, a movable head 2 will move upwards together with the blade 1 and a cutting tape 11 (FIG. 2) continuously rotating about the pulleys 12 and 12' has a cutting blade wound thereon, so that said tape in its upwards stroke will cut two slices from the mass of meat. The so cut two slices of meat will fall, due to their weight, into the two apertures 13 and 13' of the mouth part 14 (FIG. 3). Meanwhile, the feeding indexing fixture 15 with twelve recesses (FIG. 4) caused two cans 16 and 16' to arrive exactly under the two apertures 13 and 13' of the dispensing mouth 14, so that the two meat slices will be received one in each of the two cans 16 and 16'. The two pistons 17 and 17' (FIG. 5) operated as described in the cited patent, will move downwards, thusly compressing and settling the two slices into the respective cans 16 and 16'.

Meantime, the movable head 2 has reached its upper top dead center point, and then moves in the reverse direction starting its downwards stroke. Simultaneously the feeding indexing fixture will rotate about its shaft 18, through a travel of 60°, causing the two filled cans to be removed and causing two other empty cans to arrive under the two apertures 13 and 13' of the mouth part 14.

The cycle will be continuously repeated so that at the end of any upwards or downwards stroke, indifferently, of the movable head 2, two predetermined size slices of meat, sufficient to fill the size of the concerned cans, will be cut, will enter into the apertures 13 and 13' of the mouth 14 and will fall, into the cans 16 and 16' filling them, and then the pistons 17 and 17' will move downwardly, compressing and settling the respective equal amounts of sliced meat into the can themselves.

The present invention has been illustrated and described in one preferred embodiment, although it is understood that constructive variations can be practically adopted without departing from the inventive scope of the present invention. For instance, the mass of the food product loaded and compressed in the feeding reservoir, could be subdivided, instead of two portions as above described, into several portions, in order to enhance to a larger extent, the operative capacity of the machine.

Therefore, it would be necessary to accordingly increase the number of the added members, multiplying by 2, 3, 4 etc., the amount provided in the present improvement, and would be also true for the vertical cutting blade rigid with the head in its vertical reciprocation; for the vertical plate fixed to the lower zone of the supply reservoir; for the plates of the dosing chamber, for the apertures of the mouth, for the compressing pistons for the food product and finally for the recesses of the indexing fixture.

What I claim is:

1. A machine for cutting and canning food products in plastic state, particularly meat, comprising a reservoir containing a product to be canned; a movable head arranged beneath said reservoir; actuating means for actuating said movable head and including a driven shaft, a cam rotatably carried by said driven shaft, a roller for engagement by said cam, a lever on which said roller is mounted, a connecting rod connecting said lever to said movable head, whereby rotation of said cam causes a reciprocating vertical motion of said movable head; at least one vertical cutting blade operatively connected to said movable head and operable thereby for cutting the product into two equal parts; a vertical plate for maintaining separation of the two parts of the product; a pair of pulleys carried by said movable head, a continuous horizontal cutting blade wound about said pulleys for separating portions of said product parts to be canned; can feeding means for feeding empty cans below said cut portions of said product and consisting of an indexing fixture having twelve recesses for carrying two cans to the filling position during each 60° rotation of said fixture and for simultaneously removing two cans previously filled with the product, and product compressing means disposed for cooperative alignment with said cans being filled and comprising at least two pistons for simultaneously compressing the cut product portions into said cans.

References Cited

UNITED STATES PATENTS

| | | | |
|---|---|---|---|
| 3,513,626 | 5/1970 | Zhavoronkova | 53—123 |
| 3,065,584 | 11/1962 | Coleman | 53—123X |
| 3,101,761 | 8/1963 | Buehler | 53—123X |
| 3,179,041 | 4/1965 | Luthi | 53—123X |
| 3,332,202 | 7/1967 | Van Snellenberg | 53—123 |
| 3,339,335 | 9/1967 | Bowden | 53—123 |
| 3,342,013 | 9/1967 | Forthmann | 53—123 |

WAYNE A. MORSE, Primary Examiner

U.S. Cl. X.R.

53—124